United States Patent
Yang et al.

(10) Patent No.: US 10,980,051 B2
(45) Date of Patent: Apr. 13, 2021

(54) PHYSICAL DOWNLINK CONTROL CHANNEL (PDCCH) REPETITION AND DECODING FOR ULTRA-RELIABILITY LOW LATENCY COMMUNICATION (URLLC)

(71) Applicant: QUALCOMM Incorporated, San Diego, CA (US)

(72) Inventors: Wei Yang, San Diego, CA (US); Seyedkianoush Hosseini, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/250,377

(22) Filed: Jan. 17, 2019

(65) Prior Publication Data

US 2019/0230697 A1 Jul. 25, 2019

Related U.S. Application Data

(60) Provisional application No. 62/620,038, filed on Jan. 22, 2018.

(51) Int. Cl.
*H04W 72/12* (2009.01)
*H04L 1/18* (2006.01)
*H04W 72/04* (2009.01)

(52) U.S. Cl.
CPC ....... *H04W 72/1289* (2013.01); *H04L 1/1819* (2013.01); *H04L 1/1845* (2013.01);
(Continued)

(58) Field of Classification Search
CPC .............. H04W 28/04; H04W 64/003; H04W 72/0446; H04W 72/0413; H04W 72/04
See application file for complete search history.

(56) References Cited

U.S. PATENT DOCUMENTS

| | | |
|---|---|---|
| 2014/0185534 A1 | 7/2014 | Vos et al. |
| 2015/0270931 A1 | 9/2015 | Sun et al. |

(Continued)

FOREIGN PATENT DOCUMENTS

| | | |
|---|---|---|
| EP | 2922225 A1 | 9/2015 |
| WO | 2017148510 A1 | 9/2017 |

OTHER PUBLICATIONS

International Search Report and Written Opinion—PCT/US2019/014262—ISA/EPO—dated May 2, 2019.

(Continued)

*Primary Examiner* — Iqbal Zaidi
(74) *Attorney, Agent, or Firm* — Patterson & Sheridan, L.L.P.

(57) ABSTRACT

Certain aspects of the present disclosure relate generally to wireless communications systems, and more particularly, to soft combining of control information. For example, certain aspects provide a method for wireless communication. The method generally includes monitoring for control information in each of a plurality of physical downlink control channel (PDCCHs) during a different one of a plurality of time intervals, wherein the PDCCHs contain the same control information that indicates a resource allocation within a respective one of the time intervals for receiving one of a plurality of physical downlink shared channels (PDSCHs), wherein data in each of the plurality of PDSCHs is the same. In certain aspects, the method also includes soft-combining the plurality of PDCCHs to decode the control information, and decoding the control information based on the soft-combination of the plurality of PDCCHs.

30 Claims, 13 Drawing Sheets

(52) U.S. Cl.
CPC ..... *H04W 72/044* (2013.01); *H04W 72/1273* (2013.01); *H04L 1/188* (2013.01)

(56) References Cited

U.S. PATENT DOCUMENTS

| | | | |
|---|---|---|---|
| 2019/0254110 A1* | 8/2019 | He | H04L 41/0896 |
| 2019/0268097 A1* | 8/2019 | Panteleev | H04L 1/08 |
| 2019/0319686 A1* | 10/2019 | Chen, IV | H04W 72/046 |

OTHER PUBLICATIONS

Qualcomm Incorporateo: "NB-PBCH Design", 3GPP Draft; R1-160875, vol. RAN WG1, No. St Julian's, Malta; Feb. 15, 2016-Feb. 19, 2016 Feb. 14, 2016, XP051054199, URL: http://www.3gpp.org/ftp/Meetings_3GPP_SYNC/ RAN1/Docs/ [retrieved on Feb. 14, 2016], 9 pages.

* cited by examiner

| Mini-slot Indices | n 1 | n 2 | ... | n K-1 | n K |
|---|---|---|---|---|---|
| Scrambling sequences indices | | | | | |
| Mini-slot Indices | (n-1,n) [1,2] | (n-1,n) [2,3] | ... | (n-1,n) [K-1,K] | |
| Scrambling sequences indices | | | | | |
| Mini-slot Indices | (n-K+2,..., n-1, n) [1,2,...,K-1] | (n-K+2,..., n-1, n) [2,3,...,K] | ... | | |
| Scrambling sequences indices | | | | | |
| Mini-slot Indices | (n-K+1,..., n-1, n) [1,2,...,K] | | ... | | |
| Scrambling sequences indices | | | | | |

| Mini-slot Indices<br>RV indices | n<br>1 | n<br>2 | ... | n<br>K-1 | n<br>K |
|---|---|---|---|---|---|
| Mini-slot Indices<br>RV indices | (n-1,n)<br>[1,2] | (n-1,n)<br>[2,3] | ... | (n-1,n)<br>[K-1,K] | |
| | ... | ... | ... | ... | ... |
| Mini-slot Indices<br>RV indices | (n-K+2,..., n-1, n)<br>[1,2,...,K-1] | (n-K+2,..., n-1, n)<br>[2,3,...,K] | | | |
| Mini-slot Indices<br>RV indices | (n-K+1,..., n-1, n)<br>[1,2,...,K] | | | | |

PHYSICAL DOWNLINK CONTROL CHANNEL (PDCCH) REPETITION AND DECODING FOR ULTRA-RELIABILITY LOW LATENCY COMMUNICATION (URLLC)

CROSS-REFERENCE TO RELATED APPLICATIONS

This application claims benefit of U.S. Provisional Patent Application Ser. No. 62/620,038, filed Jan. 22, 2018, which is expressly incorporated herein by reference in its entirety.

BACKGROUND

Field of the Disclosure

Aspects of the present disclosure relate generally to wireless communications systems, and more particularly, to soft combining of control information.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more gNBs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A gNB or DU may communicate with a set of UEs on downlink channels (e.g., for transmissions from a base station or to a UE) and uplink channels (e.g., for transmissions from a UE to a gNB or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for soft-combining control information.

Certain aspects of the present disclosure provide a method for wireless communication. The method generally includes monitoring for control information in each of a plurality of physical downlink control channel (PDCCHs) during a different one of a plurality of time intervals, wherein the control information in the PDCCHs contain the same control information that indicates a resource allocation within a respective one of the time intervals for receiving one of a plurality of physical downlink shared channels (PDSCHs), wherein data in each of the plurality of PDSCHs is the same, soft-combining the plurality of PDCCHs to decode the control information, and decoding the control information based on the soft-combination of the plurality of PDCCHs.

Certain aspects of the present disclosure provide a method for wireless communication. The method generally includes determining a resource allocation within each of a plurality of time intervals for transmitting a respective one of a plurality of PDSCHs, wherein data in each of the plurality of PDSCHs is the same, transmitting control information in each of a plurality of PDCCHs, each of the PDCCHs being transmitted during one of the plurality of time intervals, the PDCCHs having the same control information that indicates the resource allocation within respective one of the plurality of time intervals, and transmitting each of the plurality of PDSCHs during one of the plurality of time intervals based on the resource allocation.

Certain aspects of the present disclosure provide an apparatus for wireless communication. The apparatus generally includes at least one antenna, and a processing system configured to monitor, via the at least one antenna, for control information in each of a plurality of PDCCHs during a different one of a plurality of time intervals, wherein the PDCCHs contain the same control information that indicates a resource allocation within a respective one of the time intervals for receiving one of a plurality of PDSCHs, wherein data in each of the plurality of PDSCHs is the same, soft-combine the plurality of PDCCHs to decode the control information, and decode the control information based on the soft-combination of the plurality of PDCCHs.

Certain aspects of the present disclosure provide an apparatus for wireless communication. The apparatus generally includes at least one antenna, and a processing system configured to determine a resource allocation within each of a plurality of time intervals for transmitting a respective one of a plurality of PDSCHs, wherein data in each of the plurality of PDSCHs is the same, transmit, via the at least one antenna, control information in each of a plurality of PDCCHs, each of the PDCCHs being transmitted during one of the plurality of time intervals, the PDCCHs having the same control information that indicates the resource allocation within respective one of the plurality of time intervals, and transmit, via the at least one antenna, each of the plurality of PDSCHs during one of the plurality of time intervals based on the resource allocation.

Certain aspects of the present disclosure provide an apparatus for wireless communication. The apparatus generally includes means for monitoring for control information in each of a plurality of PDCCHs during a different one of a plurality of time intervals, wherein the PDCCHs contain the same control information that indicates a resource allocation within a respective one of the time intervals for receiving one of a plurality of PDSCHs, wherein data in each of the plurality of PDSCHs is the same, means for soft-combining the plurality of PDCCHs to decode the control information, and means for decoding the control information based on the soft-combination of the plurality of PDCCHs.

Certain aspects of the present disclosure provide an apparatus for wireless communication. The apparatus generally includes means for determining a resource allocation within each of a plurality of time intervals for transmitting a respective one of a plurality of PDSCHs, wherein data in each of the plurality of PDSCHs is the same, means for transmitting control information in each of a plurality of PDCCHs, each of the PDCCHs being transmitted during one of the plurality of time intervals, the PDCCHs having the same control information that indicates the resource allocation within respective one of the plurality of time intervals, and means for transmitting each of the plurality of PDSCHs during one of the plurality of time intervals based on the resource allocation.

Certain aspects of the present disclosure provide a computer-readable medium having instructions stored thereon for monitoring for control information in each of a plurality of PDCCHs during a different one of a plurality of time intervals, wherein the PDCCHs contain the same control information that indicates a resource allocation within a respective one of the time intervals for receiving one of a plurality of PDSCHs, wherein data in each of the plurality of PDSCHs is the same, soft-combining the plurality of PDCCHs to decode the control information, and decoding the control information based on the soft-combination of the plurality of PDCCHs.

Certain aspects of the present disclosure provide a computer-readable medium having instructions stored thereon for determining a resource allocation within each of a plurality of time intervals for transmitting a respective one of a plurality of PDSCHs, wherein data in each of the plurality of PDSCHs is the same, transmitting control information in each of a plurality of PDCCHs, each of the PDCCHs being transmitted during one of the plurality of time intervals, the PDCCHs having the same control information that indicates the resource allocation within respective one of the plurality of time intervals, and transmitting each of the plurality of PDSCHs during one of the plurality of time intervals based on the resource allocation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
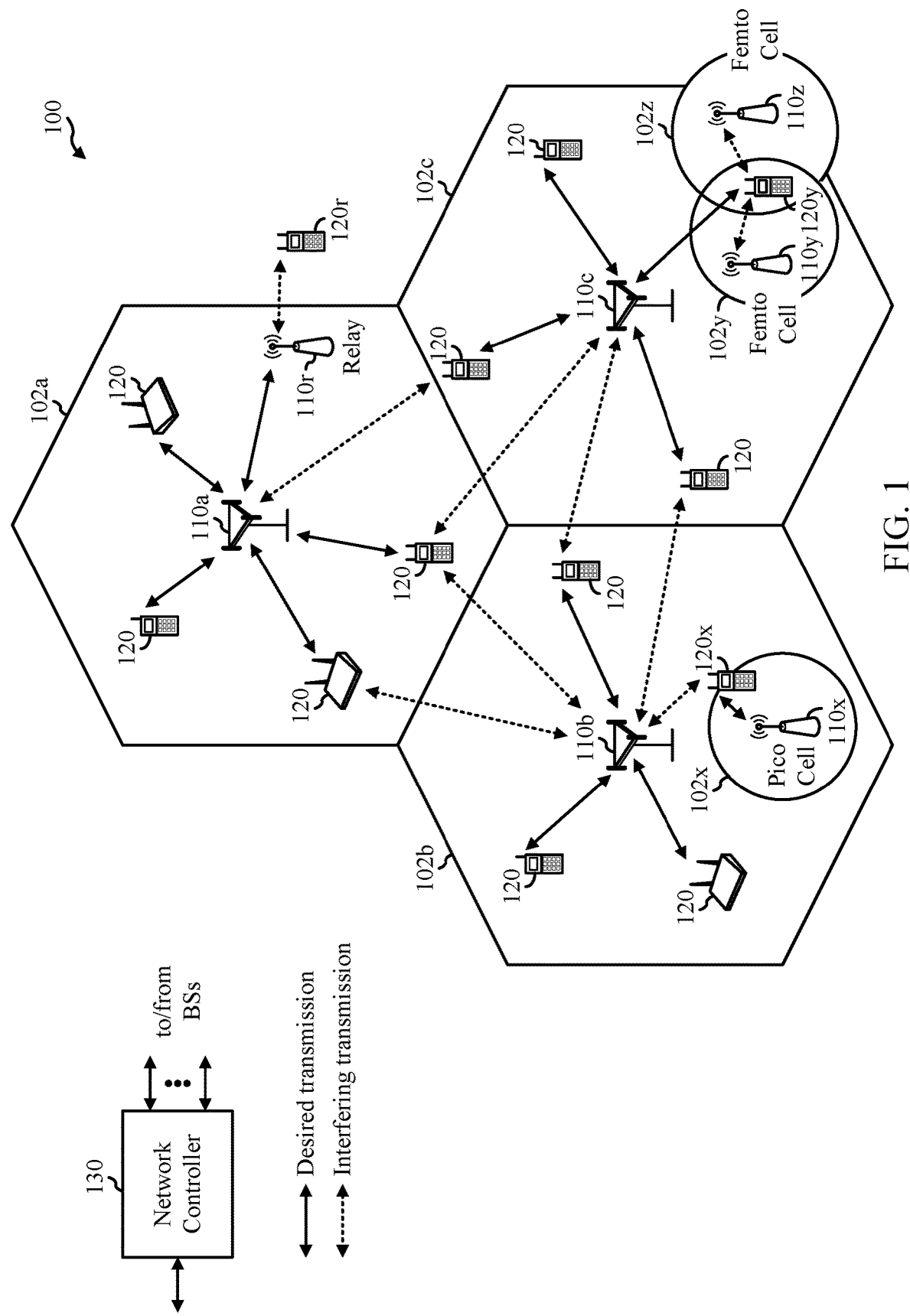
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may be a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a gNB 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the gNB 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of gNBs 110 and other network entities. A gNB may be a station that communicates with UEs. Each gNB 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile gNB. In some examples, the gNBs may be interconnected to one another and/or to one or more other gNBs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A gNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A gNB for a macro cell may be referred to as a macro gNB. A gNB for a pico cell may be referred to as a pico gNB. A gNB for a femto cell may be referred to as a femto gNB or a home gNB. In the example shown in FIG. 1, the gNBs 110a, 110b and 110c may be macro gNBs for the macro cells 102a, 102b and 102c, respectively. The gNB 110x may be a pico gNB for a pico cell 102x. The gNBs 110y and 110z may be femto gNB for the femto cells 102y and 102z, respectively. A gNB may support one or multiple (e.g., three) cells.

The wireless network 100 may also include relay stations. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs. In the example shown in FIG. 1, a relay station 110r may communicate with the gNB 110a and a UE 120r in order to facilitate communication between the gNB 110a and the UE 120r. A relay station may also be referred to as a relay gNB, a relay, etc.

The wireless network 100 may be a heterogeneous network that includes gNBs of different types, e.g., macro gNB, pico gNB, femto gNB, relays, etc. These different types of gNBs may have different transmit power levels, different coverage areas, and different impact on interference in the wireless network 100. For example, a macro gNB may have a high transmit power level (e.g., 20 Watts) whereas pico gNB, femto gNB, and relays may have a lower transmit power level (e.g., 1 Watt).

The wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. The techniques described herein may be used for both synchronous and asynchronous operation.

A network controller 130 may couple to a set of gNBs and provide coordination and control for these gNBs. The network controller 130 may communicate with the gNBs 110 via a backhaul. The gNBs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a gNB, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving gNB, which is a gNB designated to serve the UE on the downlink and/or uplink. A finely dashed line with double arrows indicates interfering transmissions between a UE and a gNB.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot.

A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a gNB) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. gNBs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

Figure 2:
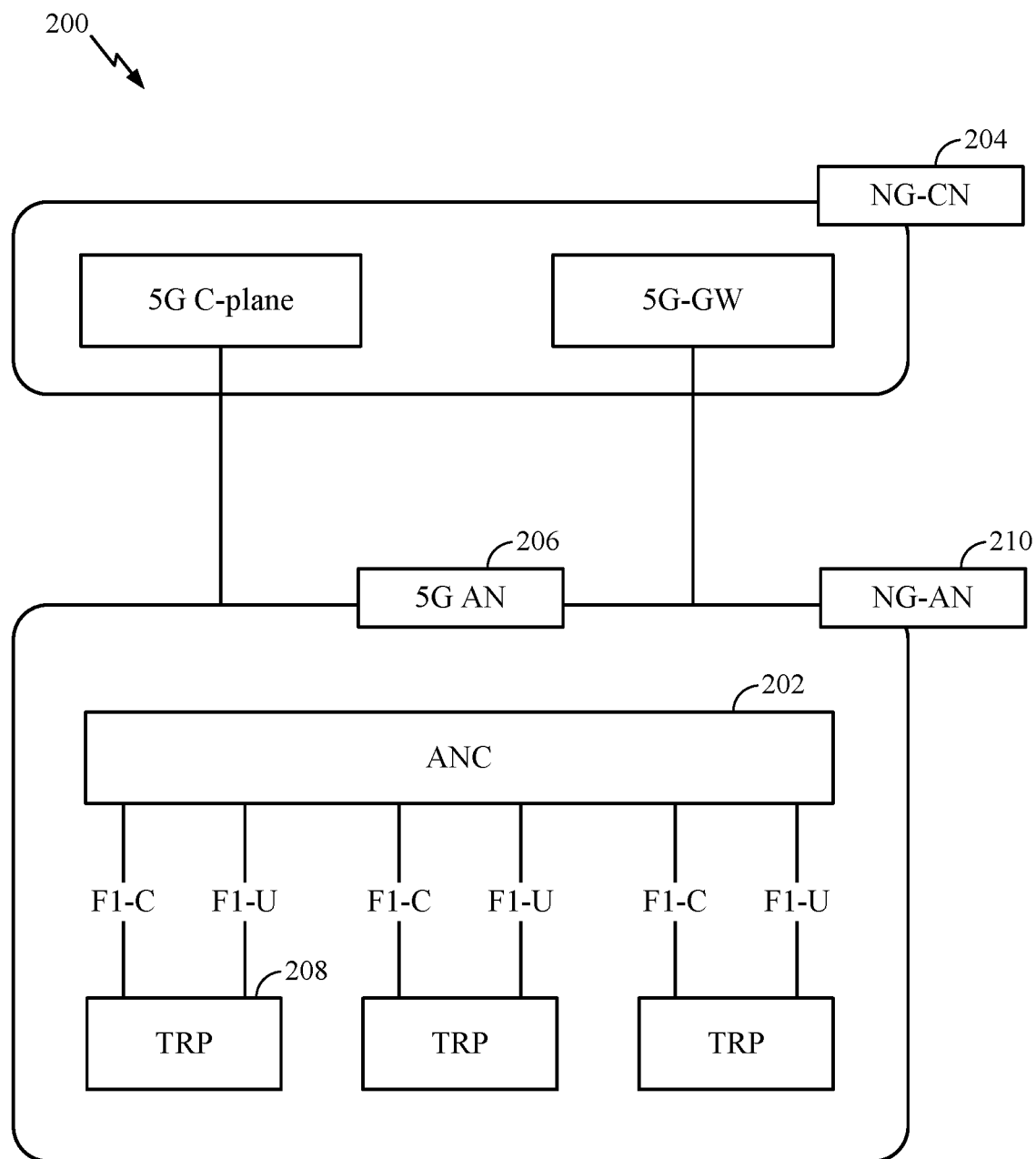
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, gNBs, or some other term).

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP may include one or more antenna ports. The RPs may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may be present.

The logical architecture of the distributed RAN 200 may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
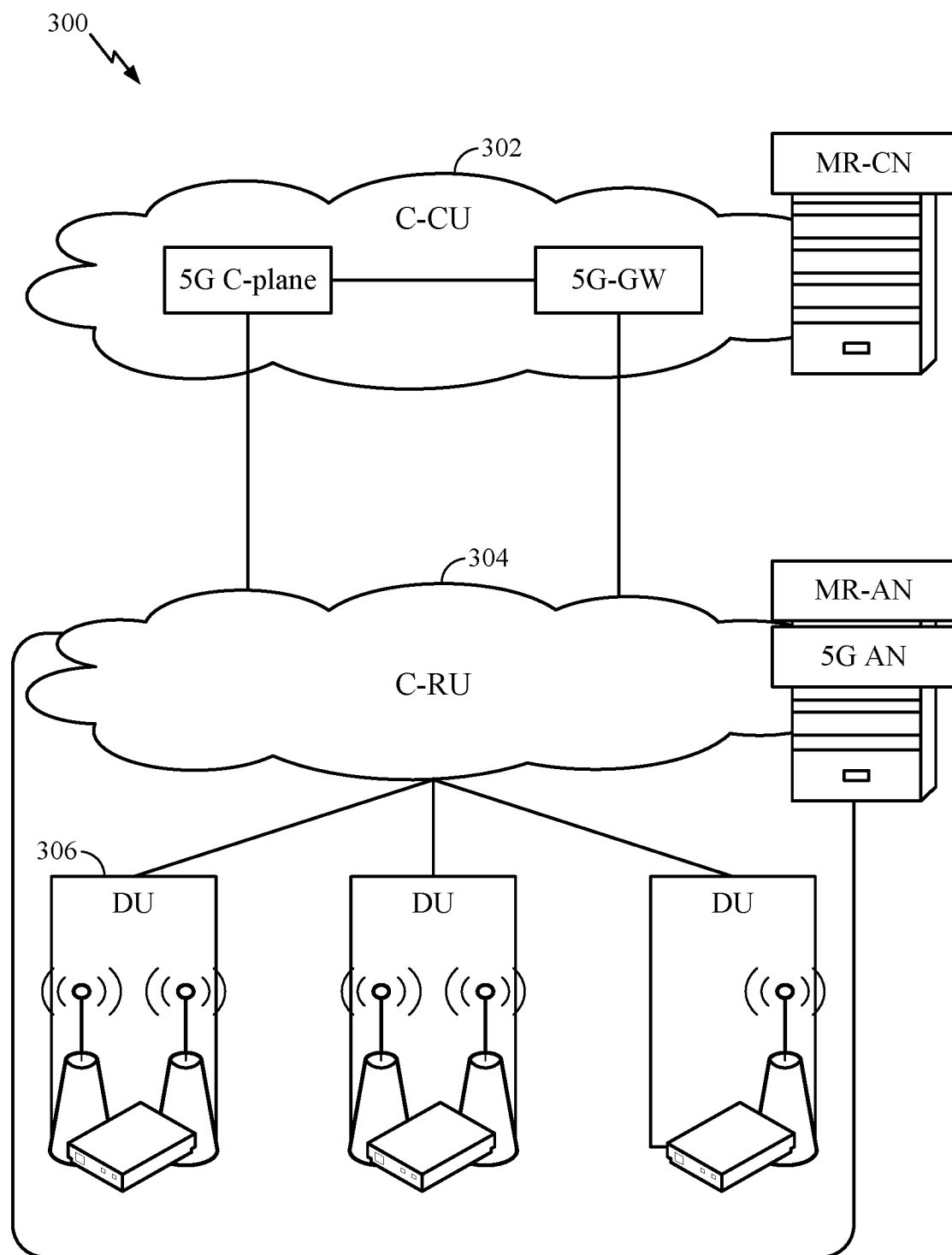
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
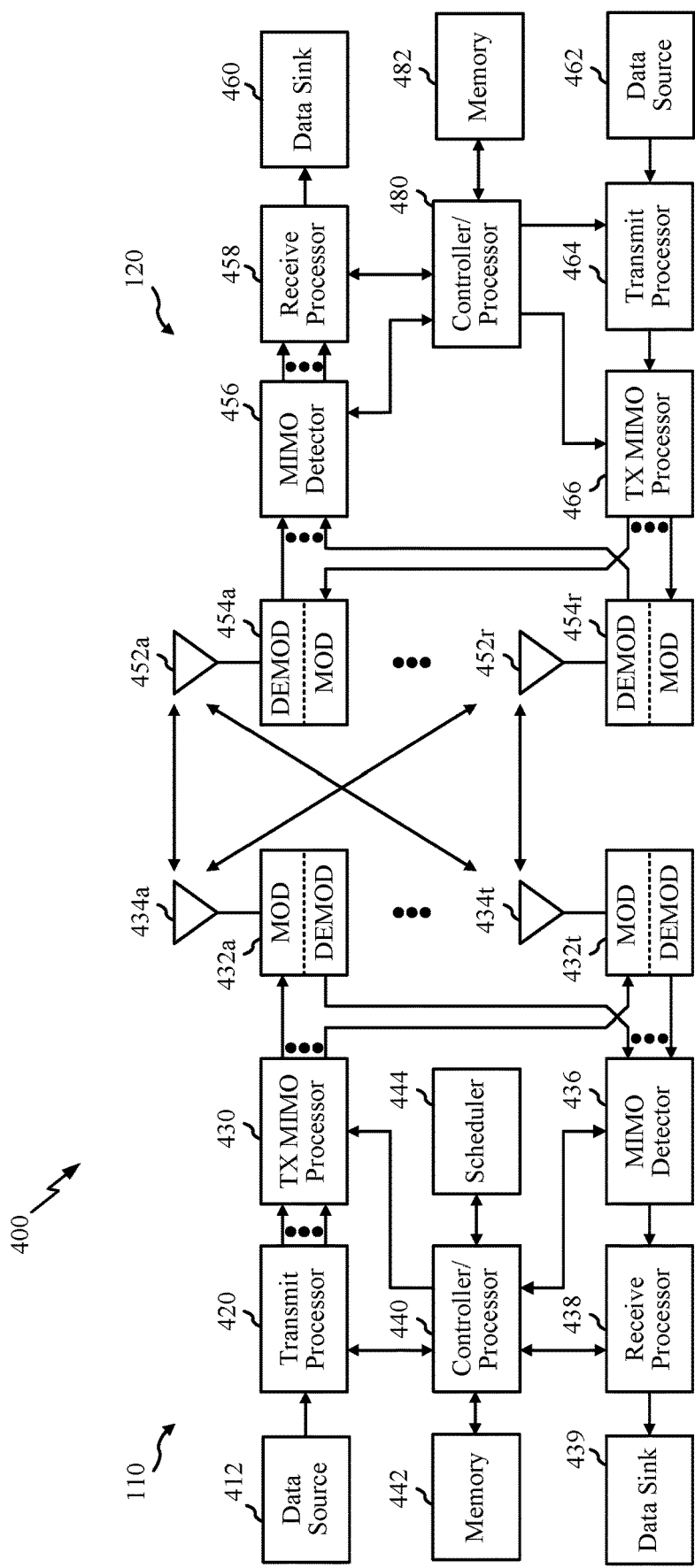
FIG. 4 is a block diagram conceptually illustrating a design of an example base station (BS) and user equipment (UE), in accordance with certain aspects of the present disclosure.

FIG. 4 illustrates example components of the gNB 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 and/or antennas 434, processors 460, 420, 438, and/or controller/processor 440 of the gNB 110 may be used to perform the operations described herein and illustrated with reference to FIGS. 9-11.

FIG. 4 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 434a through 434t, and the UE 120 may be equipped with antennas 452a through 452r.

At the gNB 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the gNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the gNB 110. At the gNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the gNB 110 and the UE 120, respectively. The processor 440 and/or other processors and modules at the gNB 110 may perform or direct, e.g., the execution of various processes for the techniques described herein. The processor 480 and/or other processors and modules at the UE 120 may also perform or direct, e.g., the execution of the functional blocks illustrated in FIGS. 9 and 11, and/or other processes for the techniques described herein. The processor 440 and/or other processors and modules at the gNB 110 may also perform or direct, e.g., the execution of the functional blocks illustrated in FIG. 10, and/or other processes for the techniques described herein. The memories 442 and 482 may store data and program codes for the gNB 110 and the UE 120, respectively. A scheduler 444 may schedule UEs for data transmission on the downlink and/or uplink.

Figure 5:
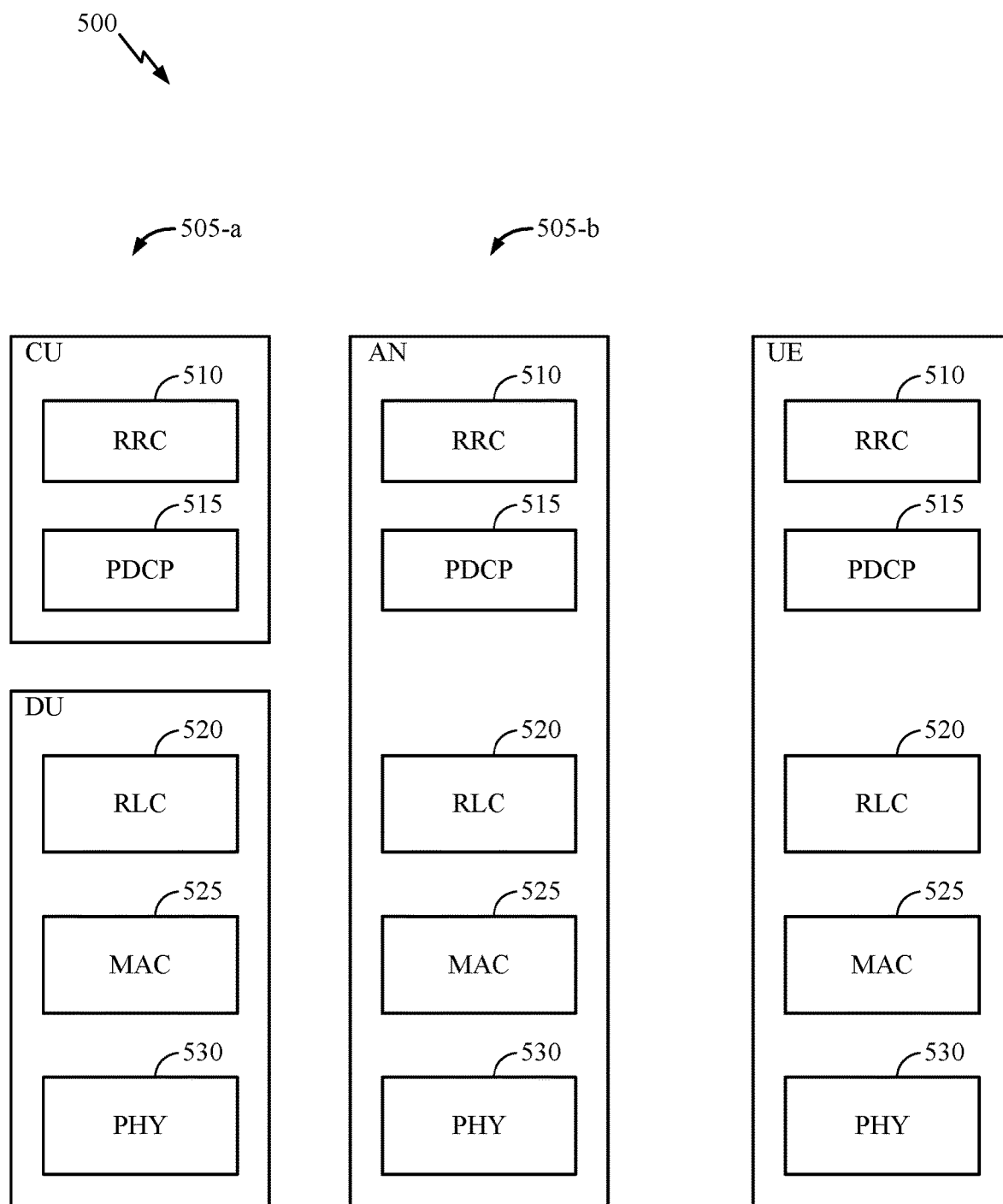
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
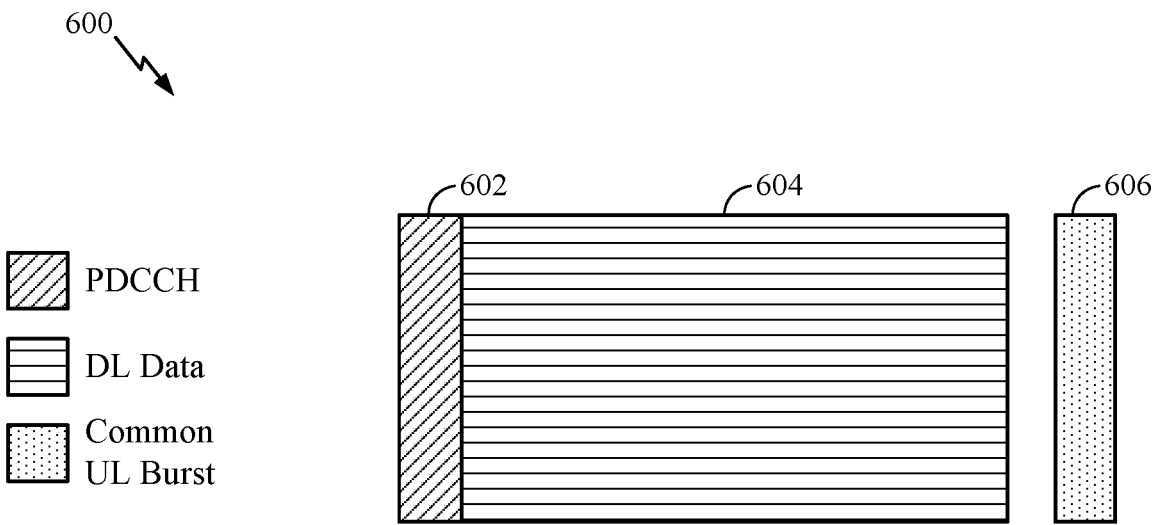
FIG. 6 illustrates an example of a downlink-centric subframe, in accordance with certain aspects of the present disclosure.

FIG. 6 is a diagram showing an example format of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or gNB) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
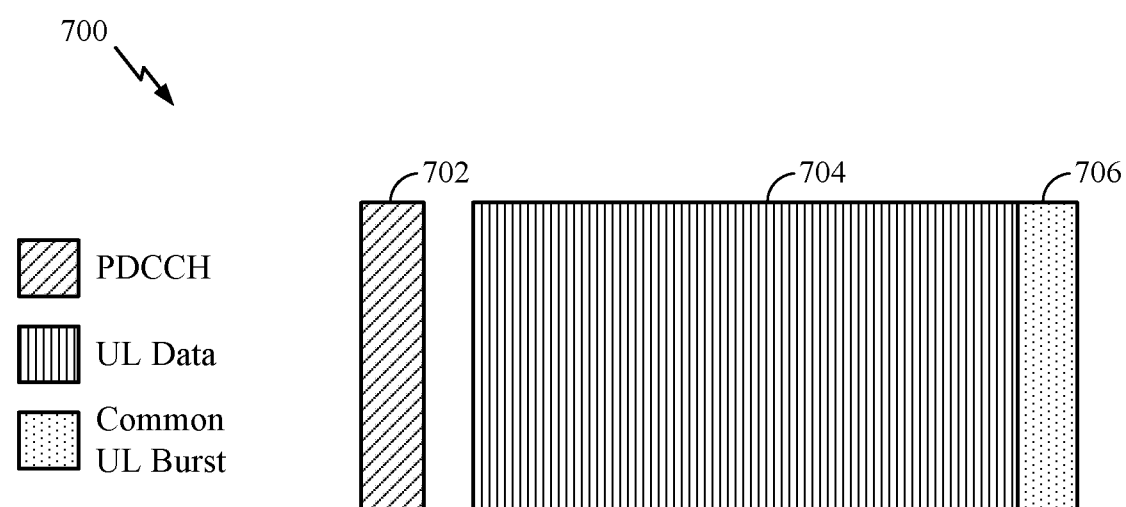
FIG. 7 illustrates an example of an uplink-centric subframe, in accordance with certain aspects of the present disclosure.

FIG. 7 is a diagram showing an example format of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or gNB). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe 700 and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or gNB), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Aspects of the present disclosure provide apparatus, methods, processing systems, and computer program products for new radio (NR) (new radio access technology or 5G technology). New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service. The RAN may include a central unit (CU) and distributed units (DUs). A NR Node B (e.g., 5G Node B) may correspond to one or multiple transmission reception points (TRPs).

Example Techniques for Physical Downlink Control Channel (PDCCH) Repetition and Decoding for Ultra-Reliability Low Latency Communication (URLLC)

Ultra-reliability low latency communication (URLLC) generally refers to relatively tight (e.g., stringent) requirements for successful delivery of a packet within a stringent deadline (e.g., 1 ms) with very high probability (e.g., 99.999%) of success. The reliability of a downlink (DL) transmission depends on the reliability of both the physical downlink control channel (PDCCH) and the physical downlink shared channel (PDSCH). The reliability of the PDSCH can be improved with the use of hybrid automatic repeat request (HARQ) (or automatic repeat request (ARQ)) that allows the receiver to combine different copies of the same data packet. However, the PDSCH packet (data packet) is not decodable if the corresponding PDCCH (control packet) is not detected. When the size of the data packet is comparable with that of the control packet (as in many URLLC applications), the control channel becomes the bottleneck of the overall communication. Certain aspects of the present disclosure provide apparatus and techniques for improving the reliability of PDCCH by repetition and spreading.

Figure 8:
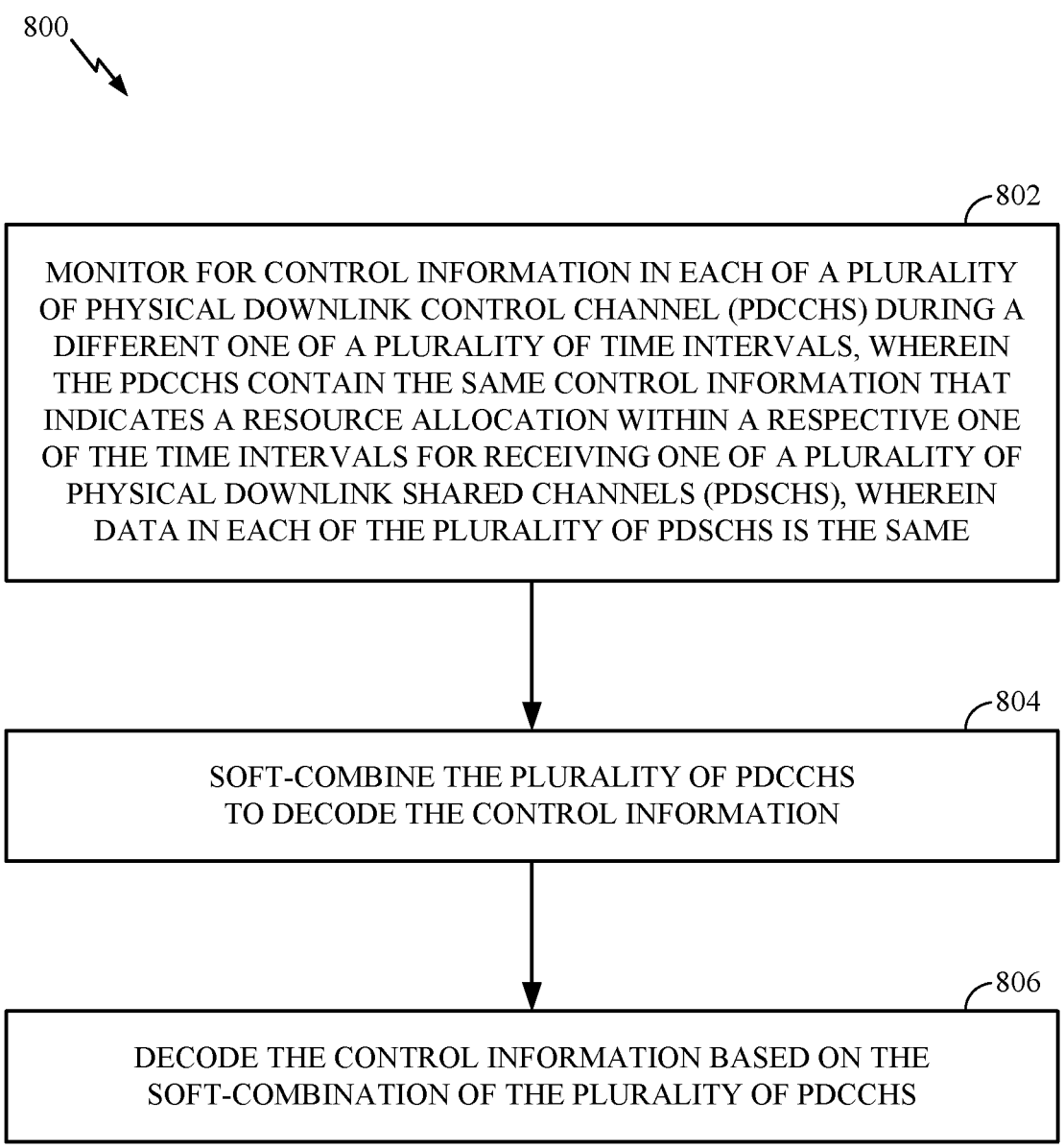
FIG. 8 illustrates example operations for wireless communication by a UE, in accordance with certain aspects of the present disclosure.

FIG. 8 illustrates example operations 800 for wireless communication, in accordance with certain aspects of the present disclosure. The operations 800 may be performed, for example, by a user-equipment (UE), such as the UE 120.

The operations 800 begin, at block 802, by monitoring for control information (e.g., downlink control information (DCI)) in each of a plurality of PDCCHs during a different one of a plurality of time intervals (e.g., a slot or mini-slot). In certain aspects, the PDCCHs may contain the same control information that indicates a resource allocation within a respective one of the time intervals for receiving one of a plurality of PDSCHs. In certain aspects, the data in each of the plurality of PDSCHs may be the same. At block 804, the operations 800 continue by soft-combining the plurality of PDCCHs to decode the control information, and at block 806, decoding the control information based on the soft-combination of the plurality of PDCCHs. In certain aspects, the operations 800 may also include receiving each of the plurality of PDSCHs in a respective one of the plurality of time intervals, soft-combining the plurality of PDSCHs, and decoding data within the plurality of PDSCHs based on the soft-combination of the plurality of PDSCHs and the resource allocation.

Figure 9:
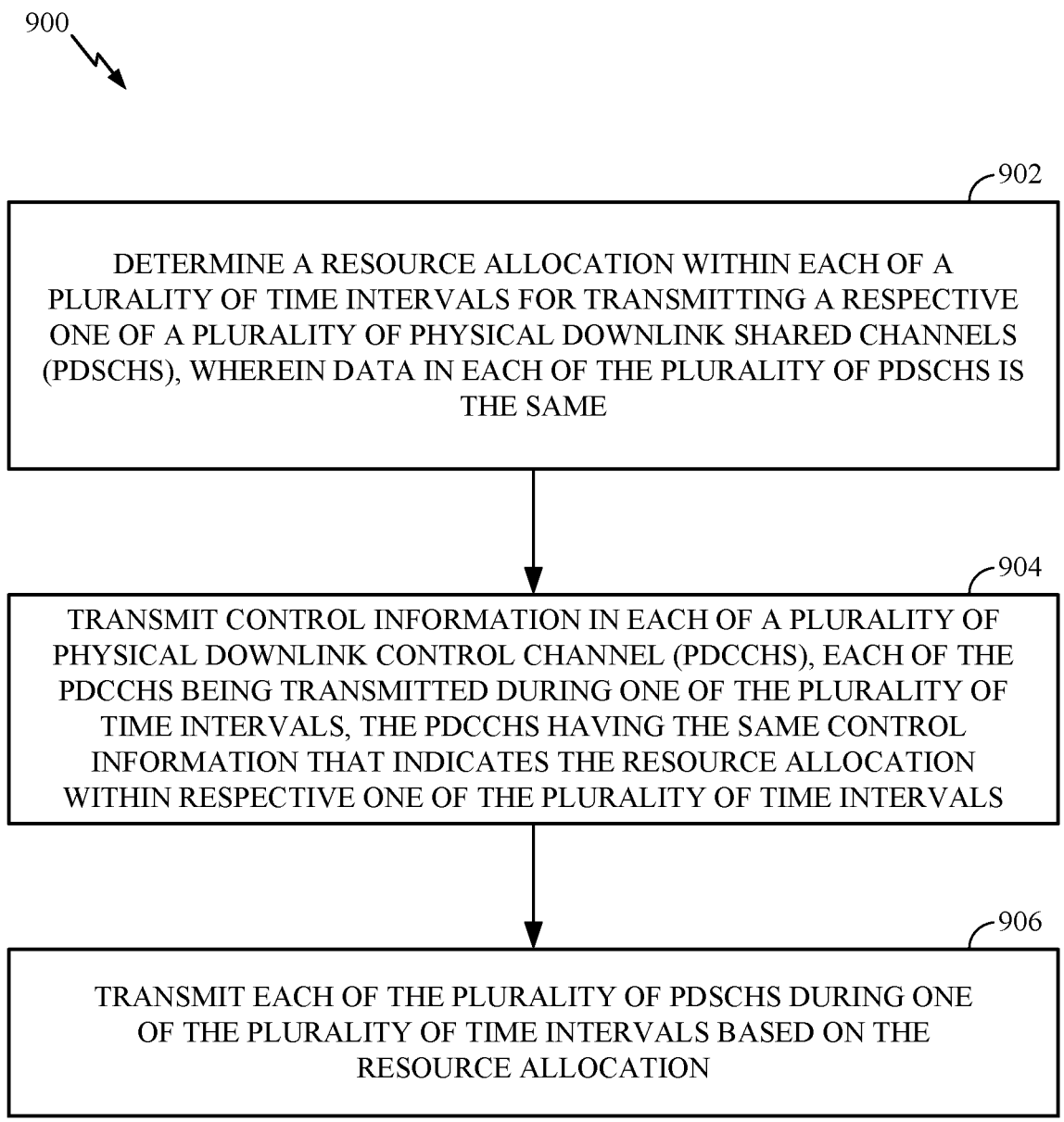
FIG. 9 illustrates example operations for wireless communication by a gNB, in accordance with certain aspects of the present disclosure.

FIG. 9 illustrates example operations 900 for wireless communication, in accordance with certain aspects of the present disclosure. The operations 900 may be performed, for example, by a base station (e.g., gNB), such as the gNB 110.

The operations 900 begin, at block 902, by determining a resource allocation within each of a plurality of time intervals for transmitting a respective one of a plurality of PDSCHs. In certain aspects, the resource allocation may be the same within each of the plurality of time intervals. In certain aspects, data in each of the plurality of PDSCHs may be the same. At block 904, the operations continue by transmitting control information in each of a plurality of PDCCHs, each of the PDCCHs being transmitted during one of the plurality of time intervals. In certain aspects, the PDCCHs may have the same control information that indicates the resource allocation within respective one of the plurality of time intervals. At block 906, each of the plurality of PDSCHs is transmitted during one of the plurality of time intervals based on the resource allocation. The operations 800 and 900 are described in more detail below with respect to FIGS. 10-14.

Figure 10:
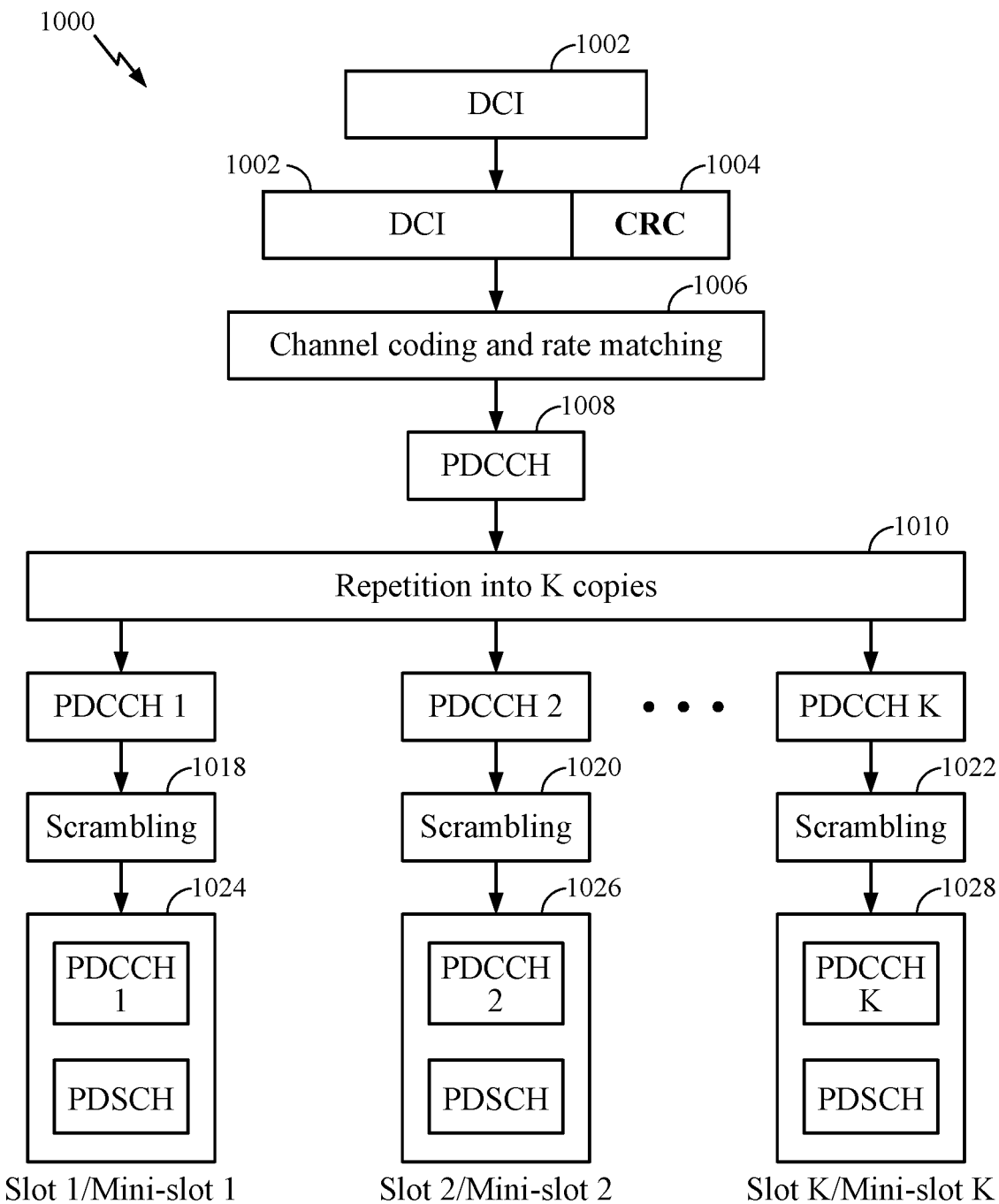
FIG. 10 illustrates a flow diagram for transmitting a physical downlink control channel (PDCCH), in accordance with certain aspects of the present application.

FIG. 10 illustrates a flow diagram 1000 for transmitting a PDCCH and a PDSCH, in accordance with certain aspects of the present application. For example, a DCI 1002 may be generated including a resource allocation for a PDSCH, and a cyclic redundancy check (CRC) 1004 may be appended onto the DCI, as illustrated. At block 1006, channel coding and rate matching may be performed, after which a PDCCH 1008 is generated having the DCI 1002 and CRC 1004. At block 1010, the PDCCH is repeated into K copies to generate PDCCH 1, PDCCH 2, to PDCCH K, as illustrated, each of which are scrambled at blocks 1018, 1020, and 1022, respectively. For example, all the PDCCHs may contain the same control information (e.g., point to the same PDSCH resources). As illustrated the copies of the PDCCHs and PDSCHs are transmitted during different time intervals 1024, 1026, and 1028, each of which may correspond to a slot (e.g., 14 OFDM symbols) or a mini-slot (e.g., 2, 4, or 7 OFDM symbols). In certain aspects, the PDCCH scrambling in different time intervals may use the same or different sequences, as will be described in more detail herein.

The PDSCHs transmitted during the different time intervals 1024, 1026, and 1028 may be either repetitions of the same data packet, or may be different self-decodable redundancy versions (RVs) of the same data packet, with a pre-defined redundancy version (RV) pattern over K repetitions. If the PDSCH packets are of different RVs, then the RVs may be communicated to the UE by modulating each of the respective RVs on the demodulation reference signal (DMRS) for the corresponding PDSCH, or modulating the respective RVs on the scrambling sequence. For example, the RV index may be mapped to a scrambling sequence index used to scramble the PDCCH. Therefore, once the sequence used to scramble the PDCCH is determined by the UE after blind decoding, the index of the sequence also indicates the RV corresponding to the PDSCH. For example, the index of a sequence used to scramble PDCCH 1 may correspond to an index of an RV of the PDSCH in the time interval 1024, and so on.

The UE may be configured with PDCCH monitoring periodicity (e.g., slot/mini-slot) based on a number of PDCCH repetitions K. For example, the UE may be configured to monitor for PDCCH in each of K time intervals (e.g., slots or mini-slots). Thus, the UE monitors the PDCCH according to the configured PDCCH monitoring periodicity. If the PDCCH monitoring periodicity is, for example, one mini-slot, depending on whether PDCCH scrambling uses the same or different scrambling sequences, the UE may perform different operations within each mini-slot. If the same scrambling sequences are used for the repeated PDCCHs, the UE may decode the PDCCH in time interval n, assuming that the PDCCH in time interval n is the first PDCCH transmission. The UE may soft-combines the PDCCH in time interval n with a PDCCH received during time interval n−1 assuming that the first PDCCH transmission is in time interval n−1.

This process is continued for all K repetitions. For example, the UE may soft-combine the PDCCH in time interval n with PDCCHs from time interval n−K+1 to n−1, assuming that the first PDCCH transmission is in time interval n−K+1. The K operations may be performed in parallel or in a serial fashion. The UE may only perform some of the K operations based on the UE capability. In other words, since all the PDCCHs may include the same DCI, the UE may perform less than the K operations. For example, the UE may only combine at most two PDCCHs (e.g., may soft-combine PDCCHs received in time interval n and n−1). For a given DCI transmission, each of the operations (i.e., decoding attempts) described herein may be counted as a blind decode. The total number of blind decodes in a given time interval may not exceed a target threshold. The target threshold may correspond to the maximum number of blind decodes a UE is able to perform in the given time interval. Thus, the number of operations that the UE performs to decode a given DCI may be determined based on the target threshold.

Figure 11:
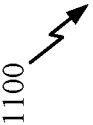
FIG. 11 is a table illustrating operations that may be performed by a UE for decoding PDCCHs that are scrambled using different sequences, in accordance with certain aspects of the present disclosure.

FIG. 11 is a table 1100 illustrating operations that may be performed by a UE for decoding PDCCHs that are scrambled using different sequences, in accordance with certain aspects of the present disclosure. Each entry (excluding the entries in the first column) in the table 1100 corresponds to one UE operation. For example, the first entry in the second row may indicate the time interval indices (e.g., n–1 and n) in which PDCCH packets are to be soft-combined and the corresponding scrambling sequence indices. For instance, in this case, the PDCCH in time interval index n–1 is scrambled by scrambling sequence index 1, and the PDCCH in time interval index n is scrambled by scrambling sequence index 2.

Depending on the capability of the UE, the UE may perform the K operations listed in one column (e.g., the second column of table 1100), or may perform the operations listed across m rows of the table 1100, where m is less than the K total number of rows. The operations performed by the UE may be performed either in parallel or in a serial fashion depending on the UEs capabilities. Each of the operations (e.g., decoding attempts) described herein may be counted as a blind decode. The total number of blind decodes in a given time interval may not exceed a target threshold corresponding to the maximum number of blind decodes a UE is able to perform in a given time interval. Thus, the number of operations that the UE performs in table 1100 for a given DCI may be determined based on the target threshold. If any of the operations previously described for decoding the PDCCH results in successful decoding (e.g., the decoded PDCCH passes CRC check performed based on the CRC 1004), then the UE may then proceed to decoding the PDSCH.

In certain aspects, the PDSCHs transmitted during the time intervals 1024, 1026 and 1028 (e.g., slots or mini-slots) may be repetitions of the same data packets. In this case, the UE soft-combines k of the PDSCHs, where k corresponds to the number of PDCCHs that were soft-combined to successfully decode the PDCCH. Thus, the UE may soft-combine the PDSCHs from time interval n–k+1 to time interval n. In certain aspects, the PDSCHs transmitted during the time intervals 1024, 1026 and 1028 may be different RVs of the same data packet. In this case, the UE may determine the RV of the PDSCH based on the modulation of the DMRS, or in accordance with the scrambling sequence for the PDCCH, as previously described, and subsequently soft-combine the corresponding PDSCHs based on determined RVs.

In certain aspects, the UE may provide feedback to the gNB after each of the time intervals (e.g., slots or mini-slots) to indicate whether the PDCCH and the PDSCH were successfully decoded. For example, if the UE decodes both PDCCH and PDSCH in a first time interval, then the UE may feedback an acknowledgement (ACK) indicating that the PDSCH was successfully decoded. In this case, the gNB may terminate any following PDCCH and PDSCH transmissions in subsequent time intervals. In certain aspects, if the UE does not successfully decode the PDCCH, the UE may not provide any feedback to the gNB. In this case, the gNB may retransmit both the PDCCH and the PDSCH in the subsequent time interval (e.g., mini-slot 2 as described with respect to FIG. 10).

If the UE decodes the PDCCH but fails to decode the PDSCH, then the UE may feedback a negative acknowledgement (NACK) indicating that the PDSCH was not successfully decoded. In this case, the gNB may terminate transmission of the PDCCH in any subsequent time intervals, but continue the transmission of the PDSCH using the same resources as indicated by the previously transmitted, and successfully decoded, PDCCH. In some cases, the gNB may continue to transmit both the PDCCH and PDSCH after receiving a NACK. In some cases, the gNB may terminate both PDCCH and PDSCH transmissions after receiving a NACK, and may reschedule a new PDSCH retransmission and a new PDCCH indicating new resources for the rescheduled PDSCH.

Figure 12:
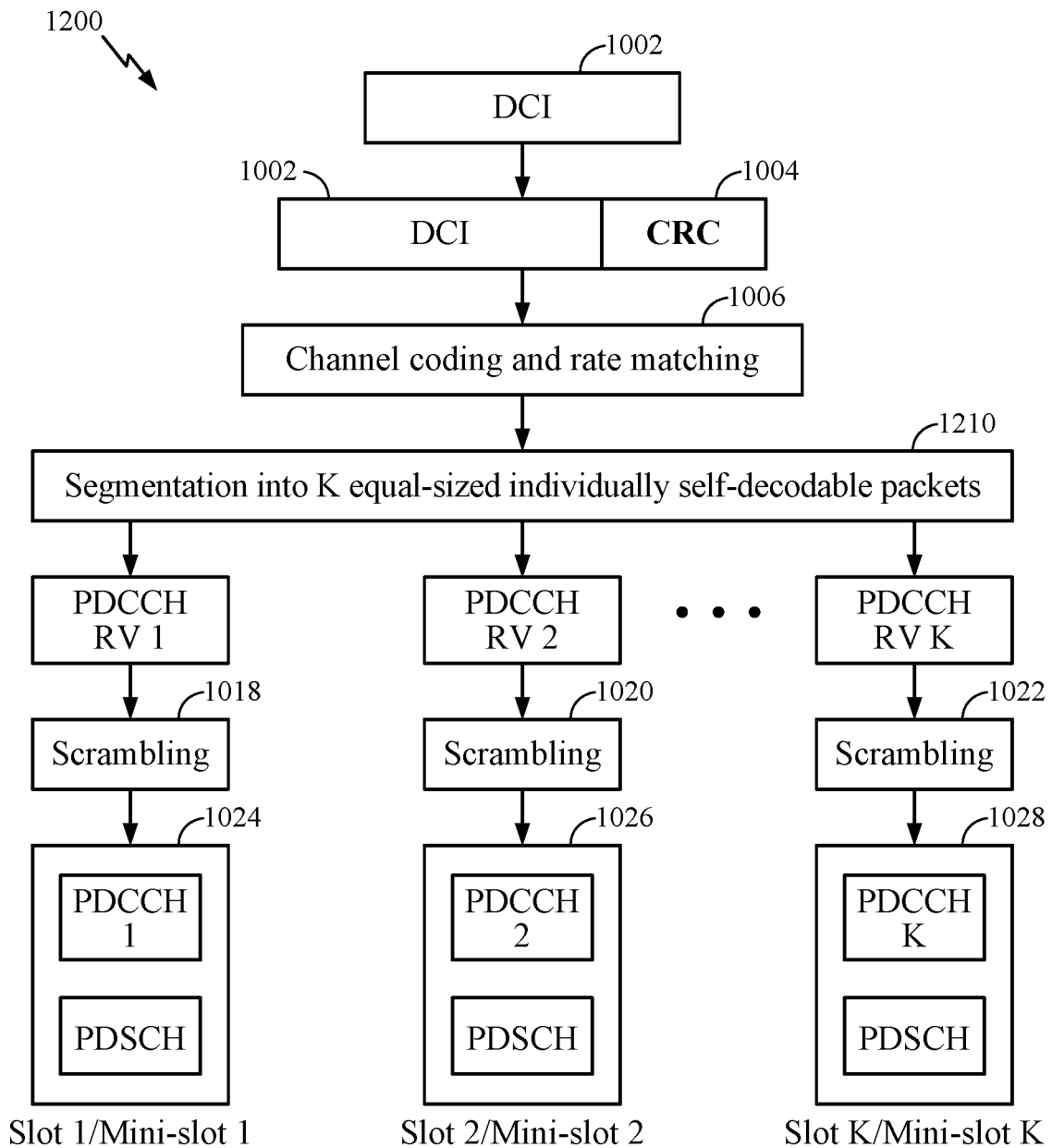
FIG. 12 illustrates a flow diagram for transmitting multiple redundancy versions (RVs) of a PDCCH, in accordance with certain aspects of the present application.

FIG. 12 illustrates a flow diagram 1200 for transmitting multiple RVs of a PDCCH, in accordance with certain aspects of the present application. In this case, the gNB may segment, at block 1210, the PDCCH into K equal-sized self-decodable packets having different RVs, and transmit K RVs of the PDCCH (e.g., PDCCH RV1, PDCCH RV2, to PDCCH RV K), as illustrated. The UE monitors for the PDCCH during each time interval (e.g., slot or mini-slot) to decode the control information in the PDCCH assuming each of the plurality of RVs, as described with respect to FIG. 13.

Figure 13:
FIG. 13 is a table illustrating operations that may be performed by a UE for decoding PDCCHs having different RVs, in accordance with certain aspects of the present disclosure.

FIG. 13 is a table 1300 illustrating operations that may be performed by a UE for decoding PDCCHs having different RVs, in accordance with certain aspects of the present disclosure. Similar to table 1100, each entry (excluding the entries in the first column) in the table 1300 corresponds to one UE operation. For example, the first element in the second row indicates the time interval indices (e.g., n–1 and n) in which PDCCH packets are to be soft-combined and the corresponding RV indices (e.g., RV index 1 corresponds to mini-slot index n–1, and RV index 2 corresponds to the mini-slot index n). Depending on the capability of the UE, the UE may perform the K operations listed in one column (e.g., the first column of table 1300), or may perform the operations listed across m rows of the table 1300, where m is less than the K total number of rows. The operations performed by the UE may be performed either in parallel or in a serial fashion depending on the UEs capabilities. Each of the operations (e.g., decoding attempts) described herein may be counted as a blind decode. The total number of blind decodes in a given time interval may not exceed a target threshold corresponding to a maximum number of blind decodes a UE is able to perform in a given time interval. Thus, the number of operations that the UE performs in the table 1300 for a given DCI may be determined based on the target threshold. If any of the operations described herein for decoding the PDCCH results in successful decoding (e.g., the decoded PDCCH passes CRC check performed based on the CRC 1004), then the UE may then proceed to decoding the PDSCH.

Figure 14:
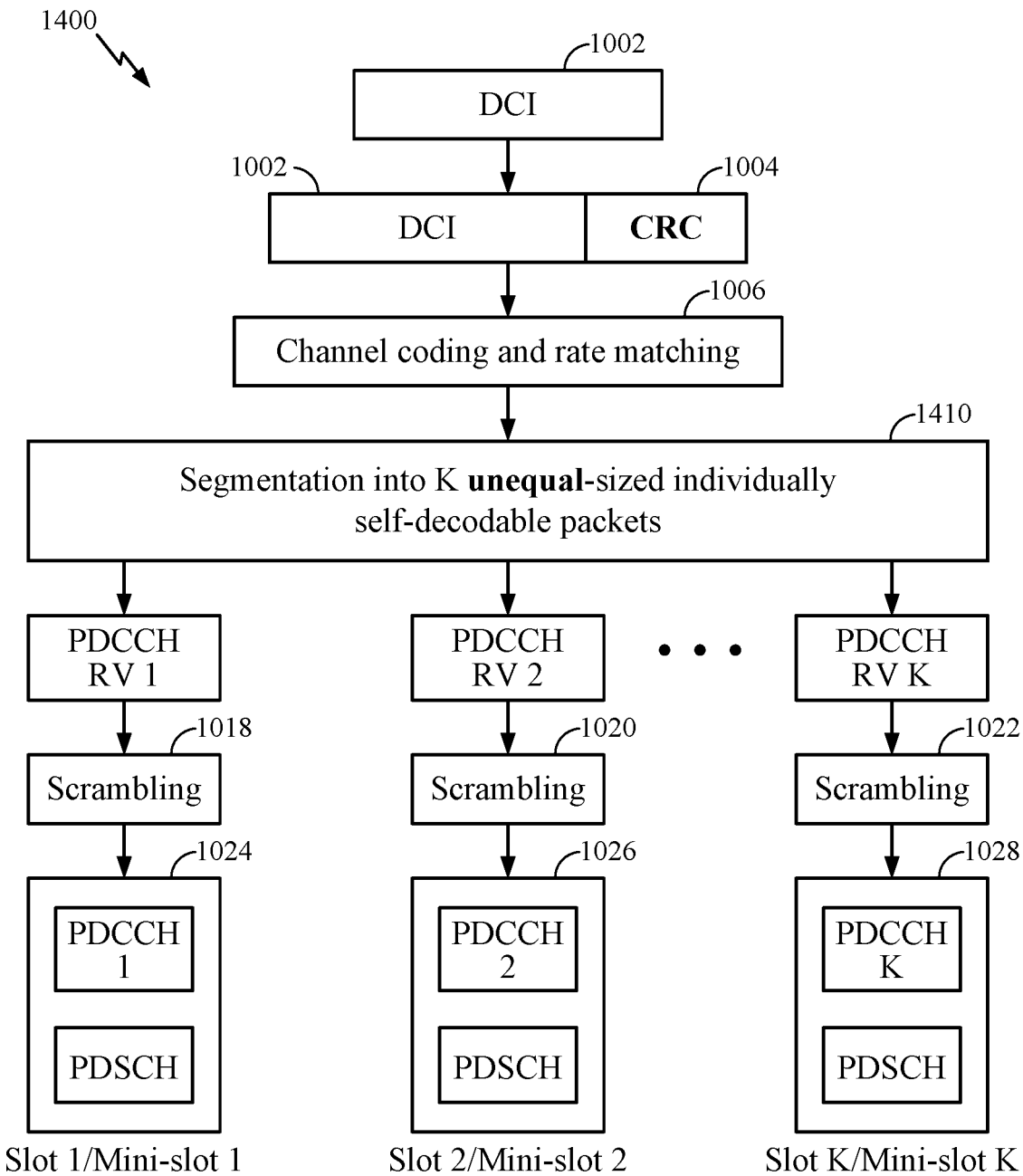
FIG. 14 illustrates a flow diagram for transmitting multiple RVs of a PDCCH having different sizes, in accordance with certain aspects of the present application.

FIG. 14 illustrates a flow diagram 1400 for transmitting multiple RVs of a PDCCH having different sizes, in accordance with certain aspects of the present application. In other words, the gNB may segment, at block 1410, the PDCCH into K unequal-sized self-decodable packets having different RVs, as illustrated. In certain aspects, the size of the PDCCH RVs may follow a pre-defined pattern that may be known by the both the gNB and the UE such that the UE can decode the PDCCH RVs based on the defined pattern. For example, the size of the PDCCH RV1, may be one control channel element (CCE), the size of the PDCCH RV2 may be one CCE, the size of the PDCCH RV3 may be two CCEs, the size of the PDCCH RV4 may be two CCEs, and so on. The PDSCHs transmitted in each of the time intervals 1024, 1026, and 1028 may also have different sizes and follow a pre-defined pattern known by both the gNB and the UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, comprising:
monitoring, at a user-equipment (UE), for control information in each of a plurality of physical downlink control channel (PDCCHs) during a different one of a plurality of time intervals, wherein the PDCCHs contain the same control information that indicates a resource allocation within a respective one of the time intervals for receiving one of a plurality of physical downlink shared channels (PDSCHs), wherein data in each of the plurality of PDSCHs is the same;
soft-combining the plurality of PDCCHs to decode the control information; and
decoding the control information based on the soft-combination of the plurality of PDCCHs.

2. The method of claim 1, further comprising:
receiving each of the plurality of PDSCHs in a respective one of the plurality of time intervals;
soft-combining the plurality of PDSCHs based on the control information; and
decoding data within the plurality of PDSCHs based on the soft-combination of the plurality of PDSCHs.

3. The method of claim 2, further comprising:
transmitting an indication, after at least one of the plurality of time intervals, of whether at least one of the control information or data within the preceding time interval was successfully decoded.

4. The method of claim 3, wherein the indication comprises:
a negative acknowledgement (NACK) if the control information in the PDCCH of the preceding time interval was successfully decoded and the data in the PDSCH of the preceding time interval is not successfully decoded; and
an acknowledgement (ACK) if the control information and the data in the preceding time interval are successfully decoded.

5. The method of claim 4, wherein each of one or more time intervals of the plurality of time intervals after the preceding time interval comprises one of the plurality of PDSCHs if the indication comprises the NACK, and wherein the preceding time interval is the last time interval having one of the plurality of PDCCHs if the indication comprises the NACK.

6. The method of claim 4, wherein the preceding time interval is the last time interval having one of the plurality of PDCCHs or one of the plurality of PDSCHs if the indication comprises the ACK.

7. The method of claim 2, further comprising:
determining a number of PDCCHs that were soft-combined before the control information was successfully decoded, wherein a number of the PDSCHs that are soft-combined corresponds to the number of the PDCCHs that were soft-combined before the control information was successfully decoded.

8. The method of claim 2, wherein each of the plurality of PDSCHs are encoded using a different redundancy version (RV) of the same data, the method further comprising determining an index corresponding to each of the RVs based on an indication from a node, wherein the plurality of PDSCHs are soft-combined based on the indices.

9. The method of claim 8, wherein the index corresponding to each of the RVs is modulated on a demodulation reference signal (DMRS) of a corresponding one of the plurality of PDSCHs.

10. The method of claim 8, further comprising determining an index corresponding to a sequence used to scramble each of the PDCCHs, wherein each of the indices corresponding to the sequences is mapped to the index of the RV of a corresponding one of the plurality of PDSCHs.

11. The method of claim 8, wherein a size of each of the RVs of the plurality of PDSCHs is different and is based on a pre-defined pattern.

12. The method of claim 1, wherein the plurality of PDCCHs are scrambled using different scrambling sequences.

13. The method of claim 12, further comprising:
decoding the control information in a first PDCCH of the plurality of PDCCHs assuming a first scrambling sequence; and
performing a cyclic redundancy check to determine whether the first PDCCH is decoded successfully.

14. The method of claim 12, further comprising:
decoding the control information in a first PDCCH of the plurality of PDCCHs assuming a first scrambling sequence and decoding the control information in a second PDCCH of the plurality of PDCCHs assuming a second scrambling sequence, wherein the second PDCCH is received prior to the first PDCCH.

15. The method of claim 1, wherein the plurality of PDCCHs are encoded using different RVs.

16. The method of claim 1, further comprising:
decoding the control information in a first PDCCH of the plurality of PDCCHs assuming a first RV;
performing a cyclic redundancy check to determine whether the first PDCCH is decoded successfully; and
decoding the control information in the first PDCCH assuming a second RV and decoding the control information in a second PDCCH of the plurality of PDCCHs assuming the first RV, wherein the second PDCCH is received prior to the first PDCCH.

17. The method of claim 1, wherein a size of each of RVs of the plurality of PDCCHs is different and is based on a pre-defined pattern.

18. A method for wireless communication, comprising:
determining, at a base station, a resource allocation within each of a plurality of time intervals for transmitting a respective one of a plurality of physical downlink shared channels (PDSCHs), wherein data in each of the plurality of PDSCHs is the same;
transmitting control information in each of a plurality of physical downlink control channel (PDCCH), each of the PDCCHs being transmitted during one of the plurality of time intervals, the PDCCHs having the same control information that indicates the resource allocation within respective one of the plurality of time intervals; and
transmitting each of the plurality of PDSCHs during one of the plurality of time intervals based on the resource allocation.

19. The method of claim 18, wherein each of the plurality of PDSCHs are encoded using a different redundancy version (RV) of the same data.

20. The method of claim 19, wherein a size of each of the RVs of the plurality of PDSCHs is different and is based on a pre-defined pattern.

21. The method of claim 19, further comprising modulating an index corresponding to each of the RVs on a demodulation reference signal (DMRS) of a corresponding one of the plurality of PDSCHs.

22. The method of claim 19, further comprising scrambling the plurality of PDCCHs using different scrambling sequences, wherein an index corresponding to each of the sequences is mapped to an index of the RV of a corresponding one of the plurality of PDSCHs.

23. The method of claim 19, wherein the plurality of PDCCHs are encoded using different RVs of the same control packet.

24. The method of claim 23, wherein a size of each of the RVs of the plurality of PDCCHs is different and is based on a pre-defined pattern.

25. The method of claim 18, further comprising determining, after each of the plurality of time intervals, whether at least one of the control information or data within the preceding time interval was successfully decoded by a user-equipment (UE).

26. The method of claim 25, wherein the determination is based on an indication from the UE.

27. The method of claim 25, wherein the determination comprises:
determining that the control information transmitted in the PDCCH transmitted during a first time interval of the plurality of time intervals was not successfully decoded by the UE if neither an acknowledgement, nor a negative acknowledgement, is received after the first time interval, method further comprising transmitting the PDCCH and the PDSCH in a second time interval of the plurality of time intervals based on the determination.

28. The method of claim 25, wherein the determination comprises:
determining that the control information transmitted in the PDCCH transmitted during a first time interval of the plurality of time intervals was successfully decoded by the UE and that the data in the PDSCH transmitted during the first time interval was not successfully decoded, if a negative acknowledgement is received after the first time interval, the method further comprising transmitting the PDSCH in a second time interval of the plurality of time intervals, and ceasing transmission of the PDCCH in the second time interval, based on the determination.

29. An apparatus for wireless communication, comprising:
at least one antenna; and
a processing system configured to:
monitor, via the at least one antenna, for control information in each of a plurality of physical downlink control channel (PDCCHs) during a different one of a plurality of time intervals, wherein the PDCCHs contain the same control information that indicates a resource allocation within a respective one of the time intervals for receiving one of a plurality of physical downlink shared channels (PDSCHs), wherein data in each of the plurality of PDSCHs is the same;
soft-combine the plurality of PDCCHs to decode the control information; and
decode the control information based on the soft-combination of the plurality of PDCCHs.

30. An apparatus for wireless communication, comprising:
at least one antenna; and
a processing system configured to:
determine a resource allocation within each of a plurality of time intervals for transmitting a respective one of a plurality of physical downlink shared channels (PDSCHs), and wherein data in each of the plurality of PDSCHs is the same;
transmit, via the at least one antenna, control information in each of a plurality of physical downlink control channel (PDCCHs), each of the PDCCHs being transmitted during one of the plurality of time intervals, wherein the PDCCHs having the same control information that indicates the resource allocation within respective one of the plurality of time intervals; and transmit, via the at least one antenna, each of the plurality of PDSCHs during one of the plurality of time intervals based on the resource allocation.

\* \* \* \* \*